US011739197B2

(12) United States Patent
Theeuwen et al.

(10) Patent No.: US 11,739,197 B2
(45) Date of Patent: Aug. 29, 2023

(54) CELLULOSE PROCESSING

(71) Applicants: COÖPERATIE KONINKLIJKE COSUN U.A., Breda (NL); NOURYON CHEMICALS INTERNATIONAL B.V., Arnhem (NL)

(72) Inventors: Conrardus Hubertus Joseph Theeuwen, Duiven (NL); Paulus Pieter De Wit, Westervoort (NL); Gijsbert Adriaan Van Ingen, Breda (NL); Franciscus Adrianus Ludovicus Maria Staps, Teteringen (NL)

(73) Assignees: COÖPERATIE KONINKLIJKE COSUN U.A., Breda (NL); NOURYON CHEMICALS INTERNATIONAL B.V., Arnhem (NL)

( * ) Notice: Subject to any disclaimer, the term of this patent is extended or adjusted under 35 U.S.C. 154(b) by 453 days.

(21) Appl. No.: 16/867,302

(22) Filed: May 5, 2020

(65) Prior Publication Data

US 2020/0270429 A1   Aug. 27, 2020

Related U.S. Application Data

(63) Continuation of application No. PCT/EP2018/080191, filed on Nov. 5, 2018.

(30) Foreign Application Priority Data

Nov. 6, 2017   (EP) .................................... 17200103

(51) Int. Cl.
| | |
|---|---|
| *C08L 1/02* | (2006.01) |
| *C08L 1/28* | (2006.01) |
| *D21B 1/02* | (2006.01) |
| *D21C 5/00* | (2006.01) |
| *D21C 9/00* | (2006.01) |

(52) U.S. Cl.
CPC ................. *C08L 1/02* (2013.01); *C08L 1/286* (2013.01); *D21B 1/028* (2013.01); *D21C 5/005* (2013.01); *D21C 9/007* (2013.01); *C08L 2205/02* (2013.01)

(58) Field of Classification Search
CPC ........ C08L 1/02; C08L 1/286; C08L 2205/02; D21C 9/007
USPC .............................................. 162/9; 536/125
See application file for complete search history.

(56) References Cited

U.S. PATENT DOCUMENTS

| | | | |
|---|---|---|---|
| 4,374,702 A | 2/1983 | Turbak et al. | |
| 4,831,127 A * | 5/1989 | Weibel ................ | C08B 37/0057 536/56 |
| 4,923,981 A * | 5/1990 | Weibel .................... | A23G 3/343 426/615 |
| 5,964,983 A | 10/1999 | Weibel et al. | |
| 6,231,657 B1 * | 5/2001 | Cantiani ................ | C09K 8/206 106/162.8 |
| 9,447,541 B2 * | 9/2016 | Heiskanen ............. | B01D 61/56 |

FOREIGN PATENT DOCUMENTS

| | | |
|---|---|---|
| EP | 0102829 A1 | 3/1984 |
| EP | 295865 A2 | 12/1988 |
| EP | 1553103 A1 | 7/2005 |

OTHER PUBLICATIONS

International Search Report dated Feb. 19, 2019 received in corresponding International Application No. PCT/EP2018/080191, 4 pages.

\* cited by examiner

*Primary Examiner* — Ganapathy Krishnan
(74) *Attorney, Agent, or Firm* — Foley & Lardner LLP

(57) ABSTRACT

The present invention relates to methods for processing plant and/or micro-organism derived cellulose materials into rheology/structuring agents. More in particular, the present invention relates to methods wherein plant and/or micro-organism derived cellulose material is co-processed with carboxycellulose. The methods of the present invention provide a variety of benefits, in terms of process efficiency and scalability as well as in relation to the properties of the materials that are obtainable using these methods. For instance, it has been found that (highly) concentrated products produced using the method of the invention are easily (re)dispersible in water and aqueous systems to regain much of the cellulose component's original rheological performance.

14 Claims, No Drawings

CELLULOSE PROCESSING

CROSS-REFERENCE TO RELATED APPLICATIONS

This application is a continuation of International Application No. PCT/EP2018/080191, filed Nov. 5, 2018, which application claims priority to European application No. 17200103.4, filed Nov. 6, 2017 both of which are hereby incorporated by reference herein in their entireties.

FIELD OF THE INVENTION

The present invention relates to methods for plant and/or micro-organism derived cellulose materials into rheology/structuring agents. More in particular the invention relates to methods wherein plant derived pulp is co-processed with carboxycellulose. The invention also provides products obtainable by these processes. Furthermore the invention relates to uses of such products.

BACKGROUND ART

Cellulose is a highly abundant organic polymer. It naturally occurs in woody and non-woody plant tissue, as well as in certain algae, oomycetes and bacteria. Cellulose has been used to produce paper and paperboard since ancient times. More recently cellulose (and its derivatives) gained substantial interest as rheology modifier.

Plant-derived cellulose is usually found in a mixture with hemicellulose, lignin, pectin and other substances, depending on the type of (tissue) cell from which it is derived. Plants form two types of cell wall that differ in function and in composition. Primary walls surround growing and dividing plant cells and provide mechanical strength but must also expand to allow the cell to grow and divide. Primary walls contain hemicellulose and pectin as the main constituents besides cellulose. The much thicker and stronger secondary wall, which accounts for most of the carbohydrate in biomass, is deposited once the cell has ceased to grow. The secondary walls are strengthened by the incorporation of large quantities of lignin.

In their natural form cellulose polymers stack together and form cellulose microfibrils. When the cellulose polymers are perfectly stacked together, it creates highly crystalline regions. However, disorder in the stacking will also occur leaving more amorphous regions in the microfibril. The crystalline regions in the microfibrils, and the very high aspect ratio, gives the material high strength. Various forms of processed cellulose have been developed having a much higher (relative) surface area than the cellulose raw material and therefore also a high number of accessible hydroxyl groups. Such materials have been found to possess beneficial rheological properties and have attracted much attention as viscosifying and/or structuring agents for aqueous systems in many fields of application. Important developments in this area started in the 1980's when materials were developed/disclosed by Turbak et al. (US U.S. Pat. No. 4,374,702) and Weibel (EP0102829), denominated 'Microfibrillated cellulose' (MFC) and 'Parenchymal cell cellulose' (PCC) respectively MFC as developed by Turbak et al. was obtained from secondary cell wall celluloses through a high-energy homogenization process. MFC is typically obtained from wood pulp, e.g. softwood sulphite pulp or Kraft pulp. The pulping process removes most of the encrusting lignin and hemicellulose from the secondary cell walls, so that nanofibrous cellulose can be liberated by treatments using high mechanical shear. MFC is a tangled mass of fibres with diameters typically in the range 20-100 nm and lengths of tens of micrometres, also referred to as 'nanofibers'.

PCC as developed by Weibel is produced from primary cell wall (parenchymal cell wall) plant materials. PCC can be obtained from agricultural processing wastes, e.g. sugar beet pulp or potato pulp. The PCC initially developed by Weibel takes the form of parenchymal cell wall fragments, from which substantially all the other components making up the primary wall (pectin and hemicellulose) have been removed. According to Weibel these fragments have to be subjected to high shear homogenization treatment so as to distend and dislocate microfibrils in the cell membrane structure, creating so-called extended or hairy membranes, which constitutes the 'activated' form of the material.

Even though materials such as MFC and PCC initially seemed very promising, full scale production and actual commercialization has been seriously hampered. One of the challenges in commercializing MFC and PCC has been to develop a process for the treatment of the cellulose that is feasible on a large (commercial-scale) basis. The fibrillation of the cellulose, and the material handling during the process, can be a challenge. The major challenge in MFC/PCC development though is to provide (sufficiently) concentrated and/or dried forms of the material, that can be easily re-dispersed while maintaining or regaining much of the material's initial performance. MFC and PCC are normally produced at a very low solid content, usually at a consistency (dry matter content) of between 1% and 5% by weight. Higher dry matter content is needed for more feasible transportation and further processing. Upon increasing the dry matter content (DM) strong aggregation and changes on the fiber surface occur (a process called hornification), which makes re-dispersion/re-activation after drying difficult if not impossible. On pilot scale, MFC and/or PCC products have been provided in a wet state, typically as 'wet' concentrate, having e.g. up to 20 or 30% DM. Such concentrates can still be re-activated to regain much of the initial performance. However, this requires the use of expensive equipment (such as high shear mixers) not typically available in standard formulation processes, and a substantial energy input. Additionally certain formulated products in which the PCC and/or MFC materials are to be applied cannot always accommodate the associated quantity of water. These aspects thus have hampered actual (commercial-scale) use of MFC, PCC and similar materials.

Unsurprisingly, this problem has been the subject of substantial research efforts, as is illustrated by the teachings of Dinand (U.S. Pat. No. 5,964,983), who set out to develop a variant of Weibel's PCC that can be taken up into suspension after dehydration. According to Dinand this was accomplished by subjecting the parenchymal cell wall material to a process that, generally stated, involves less intense chemical treatment and more mechanical shear, as compared to Weibel's process. This results in a nanofibrillated product wherein some of the pectin and hemicelluloses is retained. The mechanical treatment results in the unraveling of cellulose.

In U.S. Pat. No. 6,231,657 from Cantiani et al., it is shown that the material developed by Dinand can in fact not be (easily) redispersed after dehydration/drying to (substantially) regain the beneficial rheological properties. In order to overcome these draw-back Cantiani proposes to combine Dinand's nanofibrilated product with a carboxycellulose. Similar developments and findings have been described by Butchosa et al. (Water redispersible cellulose nanofibrils adsorbed with carboxymethyl cellulose; Cellulose (2014) 21:4349-4358). As can be inferred from the experimental findings described in these documents, and as experienced by the present inventors, the materials developed by Cantiani and Butchosa et al. still suffer from various shortcomings, such as the fact that they cannot be dried to a (sufficiently) high % DM and/or require the presence of further additives (at significant amounts) and/or cannot be re-dispersed easily and/or do not regain the rheological properties of the original PCC or MFC to a satisfactory extent. In addition, these (and other) prior art teachings are limited to laboratory scale processing of cellulose and entirely fail to address the issues encountered in the development of (economically feasible) commercial scale production.

It is an object of the present invention to provide processes that enable such commercial scale production in an economically feasible manner, to produce materials that overcome some or all of the drawbacks associated with the prior art products.

SUMMARY OF THE INVENTION

To this end, the present inventors developed a method wherein plant or micro-organism derived cellulose material is co-processed with a carboxycellulose. The methods of the present invention provide a variety of benefits, in terms of process efficiency and scalability as well as in relation to the properties of the materials obtained. For instance, it has been found that (highly) concentrated products produced using the method of the invention are easily (re)dispersible in water and aqueous systems to regain much of the cellulose component's original rheological performance. Without wishing to be bound by any particular theory, the inventors believe that in the compositions of the invention, the cellulose component primarily serves to confer the desired rheological/structuring properties while the carboxycellulose primarily serves to enable the cellulose component to be converted into a concentrated slurry, paste or wet powder, having low water content, that can be dispersed without the application of high mechanical shear forces while regaining most or all of the cellulose component's performance. The precise interaction between the cellulose component and the carboxycellulose and/or the way in which they 'associate' in the product may not be fully understood. Satisfactory results have been obtained with various combinations of cellulose components and carboxycelluloses.

A first aspect of the invention thus concerns a process of producing a composition comprising a cellulose component and a carboxycellulose; the process comprising the steps of:
a) providing a mixture of an aqueous liquid and a plant or micro-organism derived cellulose material;
b) blending a quantity of carboxycellulose with the mixture;
c) subjecting the mixture or slurry obtained in step b) to mechanical/physical and/or enzymatic activation/fibrillation treatment;
d) optionally concentrating the composition obtained in step c) to a dry matter content of at least 5 wt. %, preferably at least 10 wt. %, more preferably at least 20 wt. %; and
e) optionally, blending a further quantity of the carboxycellulose with the concentrate.
A further aspect of the invention concerns the products that are obtainable using the processes defined herein.

In another aspect of the invention, the use of the present compositions is provided for conferring structuring and/or rheological properties in aqueous products, such as detergent formulations, for example dishwasher and laundry formulations; in personal care and cosmetic products, such as hair conditioners and hair styling products; in fabric care formulations, such as fabric softeners; in paint and coating formulations as for example water-born acrylic paint formulations food and feed compositions, such as beverages, frozen products and cultured dairy; pesticide formulations; biomedical products, such as wound dressings; construction products, as for example in asphalt, concrete, mortar and spray plaster; adhesives; inks; de-icing fluids; fluids for the oil & gas industry, such drilling, fracking and completion fluids; paper & cardboard or non-woven products; pharmaceutical products.

These and other aspects of the invention will become apparent on the basis of the following detailed description and the appended examples.

DETAILED DESCRIPTION OF THE INVENTION

A first aspect of the invention thus concerns a process of producing a composition comprising a cellulose component and a carboxycellulose; the process comprising the steps of:
a) providing a mixture of an aqueous liquid and a plant or micro-organism derived cellulose material;
b) blending a quantity of carboxycellulose with the mixture;
c) subjecting the mixture or slurry obtained in step b) to mechanical/physical and/or enzymatic activation/fibrillation treatment;
d) optionally concentrating the composition obtained in step c) to a dry matter content of at least 5 wt. %, preferably at least 10 wt. %, more preferably at least 20 wt. %; and
e) optionally, blending a further quantity of the carboxycellulose with the composition as obtained in step d).
Cellulose Material—Step a)

In preferred embodiments of the invention, a slurry comprising a cellulose material is used as one of the starting materials. In accordance with the invention, the cellulose starting material is provided in the form of an aqueous slurry comprising a mixture of an aqueous liquid, typically water, and the cellulose material.

This cellulose material may originate from various sources, including woody and non-woody plant parts. For example one or more of the following cellulose-containing raw materials may be used: (a) wood-based raw materials like hardwoods and/or softwoods, (b) plant-based raw materials, such as chicory, beet root, turnip, carrot, potato, citrus, apple, grape, tomato, grasses, such as elephant grass, straw, bark, caryopses, vegetables, cotton, maize, wheat, oat, rye, barley, rice, flax, hemp, abaca, sisal, kenaf, jute, ramie, bagasse, bamboo, reed, algae, fungi and/or combinations thereof, and/or (c) recycled fibers from, for example but without limitation, newspapers and/or other paper products; and/or (d) bacterial cellulose.

As is generally understood by those skilled in the art, cellulose raw materials may be subjected to chemical, enzymatic and/or fermentative treatments that result (primarily) in the removal of non-cellulosic components typically present in parenchymal and non-parenchymal plant tissue, such as pectin and hemicellulose, in the case of parenchymal cellulose material, and lignin and hemicellulose in the case of materials derived from woody plant parts. Such treatments preferably do not result in appreciable degradation or modification of the cellulose and/or in a substantial change in the degree and type of crystallinity of the cellulose. These treatments are collectively referred to as "(bio-)chemical" treatment. In preferred embodiments of the invention, the (bio-)chemical treatment is or comprises chemical treatment, such as treatment with an acid, an alkali and/or an oxidizing agent.

In accordance with the invention it is preferred that the cellulose raw material used in the process is or originates from a parenchymal cell wall containing plant material. Parenchymal cell wall, which may also be denoted as 'primary cell wall', refers to the soft or succulent tissue, which is the most abundant cell wall type in edible plants. Suitable parenchymal cell wall containing plant material include sugar beet, citrus fruits, tomatoes, chicory, potatoes, pineapple, apple, cranberries, grapes, carrots and the like (exclusive of the stems, and leaves). For instance, in sugar beets, the parenchymal cells are the most abundant tissue surrounding the secondary vascular tissues. Parenchymal cell walls contain relatively thin cell walls (compared to secondary cell walls) which are tied together by pectin. Secondary cell walls are much thicker than parenchymal cells and are linked together with lignin. This terminology is well understood in the art. The cellulose material in accordance with the invention is preferably a material originating from sugar beet, tomato, chicory, potato, pineapple, apple, cranberry, citrus, grape and/or carrot, more preferably a material originating from sugar beet, potato and/or chicory, more preferably from sugar beet and/or chicory, most preferably from sugar beet.

In preferred embodiments of the invention, the slurry provided in step a) comprises a cellulose material comprising, on a dry weight basis, at least 50 wt. %, at least 60 wt. %, at least 70 wt. %, at least 75 wt. %, at least 80 wt. %, at least 85 wt. %, at least 90 wt. % or at least 95 wt. % of cellulose. In a particularly preferred embodiment of the invention, the cellulose component is a processed parenchymal cell cellulose material containing, by dry weight, at least 50% cellulose, 0.5-10% pectin and 1-15% hemicellulose. The term "pectin" as used herein refers to a class of plant cell-wall heterogeneous polysaccharides that can be extracted by treatment with acids and chelating agents. Typically, 70-80% of pectin is found as a linear chain of α-(1-4)-linked D-galacturonic acid monomers. It is preferred that the parenchymal cellulose material comprises 0.5-5 wt. % of pectin, by dry weight of the cellulose material, more preferably 0.5-2.5 wt. %. The term "hemicellulose" refers to a class of plant cell-wall polysaccharides that can be any of several homo- or heteropolymers. Typical examples thereof include xylane, arabinane xyloglucan, arabinoxylan, arabinogalactan, glucuronoxylan, glucomannan and galactomannan. Monomeric components of hemicellulose include, but are not limited to: D-galactose, L-galactose, D-mannose, L-rhamnose, L-fucose, D-xylose, L-arabinose, and D-glucuronic acid. This class of polysaccharides is found in almost all cell walls along with cellulose. Hemicellulose is lower in weight than cellulose and cannot be extracted by hot water or chelating agents, but can be extracted by aqueous alkali and/or acid. Polymeric chains of hemicellulose bind pectin and cellulose in a network of cross-linked fibers forming the cell walls of most plant cells. Preferably the parenchymal cellulose material comprises, by dry weight of the cellulose material, 1-15 wt. % hemicellulose, more preferably 1-10 wt. % hemicellulose, most preferably 1-5 wt. % hemicellulose.

In embodiments of the invention, the cellulose material is a (bio-)chemically treated cellulosic plant pulp comprising cellulose with a crystallinity index calculated (according to the Hermans-Weidinger method) as below 75%, below 60%, below 55%, below 50% or below 45%. In embodiments of the invention, the crystalline regions of the cellulose are primarily or entirely of the type I, which embraces types Iα and Iβ, as can be determined by FTIR spectroscopy and/or X-ray diffractometry.

In a particularly preferred embodiment of the invention, the cellulose material is a (bio-) chemically treated parenchymal cellulose material, preferably a chemically and/or enzymatically treated parenchymal plant pulp. In a particularly preferred embodiment the cellulose material is a material that is obtainable by a method comprising the steps of a1) providing a parenchymal cellulose containing plant pulp; a2) subjecting the parenchymal cellulose containing plant pulp to chemical and/or enzymatic treatment resulting in partial degradation and/or extraction of pectin and hemicellulose. Accordingly, in embodiments of the invention a process is provided as defined herein, wherein step a) comprises the steps of a1) providing a parenchymal cell containing plant pulp; a2) subjecting the parenchymal cell containing plant pulp to chemical and/or enzymatic treatment resulting in partial degradation and/or extraction of pectin and hemicellulose.

The starting material typically comprises an aqueous slurry comprising ground and/or cut plant materials, which often can be derived from waste streams of other processes, such as spent sugar beet pulp derived from conventional sugar (sucrose) production. Particularly preferred is the use of fresh, pressed-out sugar beet pulp from which the sugars have been extracted and which has a dry solids content of 10-50 wt. %, preferably 20-30 wt. %, for example approximately 25 wt. %. Sugar beet pulp is the production residuum from the sugar beet industry. More specifically, sugar beet pulp is the residue from the sugar beet after the extraction of sucrose there from. Sugar beet processors usually dry the pulp. The dry sugar beet pulp can be referred to as "sugar beet shreds". Additionally, the dry sugar beet pulp or shreds can be formed and compressed to produce "sugar beet pellets". These materials may all be used as the starting material, in which case step a) will comprise suspending the dry sugar beet pulp material in an aqueous liquid, typically to the afore-mentioned dry solids contents. Preferably however, fresh wet sugar beet pulp is used as the staring material.

Another preferred starting material is ensilaged pulp, especially ensilaged sugar beet pulp. As used herein, the term "ensilage" refers to the process of storing plant materials in a moist state under conditions resulting in acidification caused by anaerobic fermentation of carbohydrates present in the materials being treated. Ensilage is carried out according to known methods with pulps preferably containing 15 to 35% of dry matter. Ensilage of sugar beets is continued until the pH is within the range of 3.5-5. It is known that pressed beet pulps may be ensilaged to protect them from unwanted decomposition and avoid growth of pathogenic bacteria and moulds. This process is most commonly used to protect this perishable product, the other alternative being drying to at least 90% dry matter. This drying has the disadvantage of being very energy-intensive. The fermentation process starts spontaneously under anaerobic conditions with the lactic acid bacteria being inherently present. These microorganisms convert the residual sucrose of the pressed beet pulp to lactic acid, causing a fall in the pH and a strong reduction of the oxygen content. The storing of the sugar beet pulp under these conditions was found to confer specific characteristics that are advantageous with a view to the further processing of the material according to the method as defined herein and/or with a view of the characteristics of the material obtained accordingly. Hence, in embodiments of the invention, the cellulose material is obtainable by a method wherein step a1) comprises providing ensilaged parenchymal cell containing plant pulp, preferably by:

providing fresh parenchymal cell containing plant pulp, preferably fresh sugar beet pulp;

if necessary adjusting the dry matter content of the fresh plant pulp to reach a value within the range of 15-35% (w/w);

placing the plant pulp having a dry matter content of 15-35% in storage under conditions favorable to the growth of lactic acid producing bacteria including covering the pulp with airtight material; and keeping the material under said conditions favorable to the growth of lactic acid bacteria until the pH of the plant pulp has reached a value of below 5, preferably a value within the range of 3.5-5. As is known by those of average skill in the art, common ensilaging practice results in the lactic acid fermentation as the required bacterial species are inherently present in the material.

Other examples of plant pulps that may be employed in accordance with the present invention include, but are not limited to, pulps obtained from chicory, beet root, turnip, carrot, potato, citrus, apple, grape, or tomato, preferably pulps obtained from chicory, beet root, turnip, carrot or potato. Such pulps are typically obtained as side-streams in conventional processing of these plant materials. In one embodiment the use of potato pulp obtained after starch extraction is envisaged. In another embodiment of the invention, the use of potato peels, such as obtained in steam peeling of potatoes, is envisaged. In some embodiments, the use of press pulp obtained in the production of fruit juices is envisaged.

In accordance with the invention, the (bio-)chemical treatment of step a2) results in the degradation and/or extraction of at least a part of the pectin and hemicelluloses present in the parenchymal cell containing plant pulp, typically to monosaccharides, disaccharides and/or oligosaccharides, typically containing three to ten covalently bound monosaccharides. However, as indicated above, the presence of at least some pectin, such as at least 0.5 wt. %, and some hemicellulose, such as 1-15 wt. %, is preferred. As will be understood by those skilled in the art, said pectin and hemicellulose remaining in the cellulose material can be non-degraded and/or partially degraded. Hence, step a2) typically comprises partial degradation and extraction of the pectin and hemicellulose, preferably to the extent that at least 0.5 wt. % of pectin and at least 1 wt. % of hemicellulose remain in the material. It is within the routine capabilities of those skilled in the art to determine the proper combinations of reaction conditions and time to accomplish this.

Preferably, the chemical treatment as mentioned in step a2) of the above mentioned method comprises:

mixing the parenchymal cell containing plant pulp with alkaline metal hydroxide to a final concentration of 0.1-1.0 M, preferably 0.3-0.7 M; and heating the mixture of parenchymal cell containing plant pulp and alkaline metal hydroxide to a temperature within the range of 60-120° C., e.g. 80-120° C., for a period of at least 10 minutes, preferably at least 20 minutes, more preferably at least 30 minutes.

The use of alkaline metal hydroxides, especially sodium hydroxide, in the above method, is advantageous to efficiently remove pectin, hemicelluloses and proteins from the cellulose. The alkaline metal hydroxide may be sodium hydroxide. The alkaline metal hydroxide may be potassium hydroxide. The alkaline metal hydroxide may be mixed with the parenchymal cell containing plant pulp to a concentration of at least 0.1 M, at least 0.2 M, at least 0.3 M, or at least 0.4 M. The alkaline metal hydroxide concentration preferably is at less than 0.9 M, less than 0.8 M, less than 0.7 M or less than 0.6 M. The use of relatively low temperatures in the present chemical process allows the pulp to be processed with the use of less energy and therefore at a lower cost than methods known in the art employing higher temperatures. In addition, use of low temperatures and pressures ensures that minimum cellulose nanofibers are produced. The pulp may be heated to at least 60° C., or at least 80° C. Preferably, the pulp is heated to at least 90° C. Preferably, the pulp is heated to less than 120° C., preferably less than 100° C. As will be appreciated by those skilled in the art, the use of higher temperatures, within the indicated ranges, will reduce the processing times and vice versa. It is a matter of routine optimization to find the proper set of conditions in a given situation. As mentioned above, the heating temperature is typically in the range of 60-120° C., e.g. 80-120° C., for at least 10 minutes, preferably at least 20 minutes, more preferably at least 30 minutes. If the heating temperature is between 80-100° C., the heating time may be at least 60 minutes. Preferably, the process comprises heating the mixture to a temperature of 90-100° C. for 60-120 minutes, for example to a temperature of approximately 95° C. for 120 minutes. In another embodiment of the invention, the mixture is heated above 100° C., in which case the heating time can be considerably shorter. In a preferred embodiment of the present invention the process comprises heating the mixture to a temperature of 110-120° C. for 10-50 minutes, preferably 10-30 minutes.

In an embodiment of the invention, at least a part of the pectin and hemicelluloses may be degraded by treatment of the plant pulp with suitable enzymes. Preferably, a combination of enzymes is used, although it may also be possible to enrich the enzyme preparation with one or more specific enzymes to get an optimum result. Generally an enzyme combination is used with a low cellulase activity relative to the pectinolytic and hemicellulolytic activity. The enzyme treatments are generally carried out under mild conditions, e.g. at pH 3.5-5 and at 35-50° C., typically for 16-48 hours, using an enzyme activity of e.g. 65.000-150.000 units/kg substrate (dry matter). It is within the routine capabilities of those skilled in the art to determine the proper combinations of parameters to accomplish the desired rate and extent of pectin and hemicellulose degradation.

In some embodiments it is beneficial to subject the mass resulting from step a2) to treatment with an acid, in particular sulphuric acid. This step typically is performed to dissolve and optionally remove various salts from the material. It was found that by applying this step, the material eventually obtained has improved visual appearance in that it is substantially more white. Hence, the treatment of step a2) may comprise the additional step of mixing the treated parenchymal cell containing pulp with an acid in an amount to lower the pH to below 4, preferably below 3, more preferably below 2. Typically, the process of this invention will only include one acid treatment step. In some embodiments, acid treatment of the plant pulp is performed and the process does not contain any further steps wherein the material is treated with a bleaching agent. In addition, the acid treatment of the plant pulp was found to allow for even milder alkaline treatment of the material in step a2) of the present process. In a preferred embodiment, said acid is sulphuric acid. The acid treatment may be applied prior to as well as after the alkaline treatment.

It will be understood that the (bio-)chemically treated pulp may suitably be subjected to one or more washing steps after any of the (bio-)chemical treatments, so as to wash out the acids, alkali, oxidizing agents, salts, enzymes and/or degradation products. Washing can be accomplished simply by subjecting the pulp or slurry to mechanical dewatering treatments, using e.g. a filter press and taking up the 'retentate' in fresh (tap) water, an acid or alkali, as is suitable. As will be understood by those skilled in the art, the pulp can be dewatered quite easily at this stage of the process as it has not yet been activated. In preferred embodiments of the invention, after the treatment with the alkali and/or enzyme and, optionally, the acid, has been completed, the treated pulp obtained accordingly is subjected to washing and is taken up in a quantity of aqueous liquid, such as (tap) water, to obtain the aqueous slurry comprising a mixture of a aqueous liquid and cellulose material, having the appropriate wt. % of the cellulose material as specified herein elsewhere.

Addition of Carboxycellulose—Step b)

In step b) of the process described earlier, the slurry provided in step a) is blended with carboxycellulose.

As used herein, the term carboxycellulose refers to derivatives of cellulose comprising carboxylic acid groups bound to some of the hydroxyl groups of the cellulose monomers, usually by means of a linking group, whereby the anionic carboxy groups which typically render the derivative to become water soluble. In accordance with the invention, the carboxycellulose preferably is carboxymethylcellulose (CMC), although other variants may also suitably be used. The carboxylic acid groups may also be (partially) present in the salt and/or ester form. Suitably the sodium salt of a carboxycellulose is used. All of such compounds are herein defined to be anionic.

In accordance with the invention, the carboxycellulose, in particular the carboxymethyl cellulose (CMC), suitably has a degree of substitution of the carboxy-containing groups ranging between 0.2 and 1.5. In an embodiment of the invention, the degree of substitution is at least 0.3, at least 0.4, at least 0.5 or at least 0.6. In an embodiment of the invention, the degree of substitution is less than 1.4, less than 1.3, less than 1.2, less than 1.1, less than 1.0, or less than 0.9. The degree of substitution corresponds to the average number of substituent groups (in particular carboxymethyl groups) attached per number of carboxyl groups (in particular carboxymethyl groups) per anhydrous glucose unit (AGU) of the cellulose.

The carboxycellulose of this invention can contain non-ionic groups such as alkyl or hydroxy alkyl groups, e.g. hydroxymethyl, hydroxyethyl, hydroxypropyl, hydroxylbutyl and mixtures thereof, e.g. hydroxyethyl methyl, hydroxypropyl methyl, hydroxybutyl methyl, hydroxyethyl ethyl, hydroxypropyl ethyl and mixtures thereof. In an embodiment of the invention, the carboxycellulose contains both carboxy and non-ionic groups, as in carboxymethyl hydroxyethyl cellulose, carboxymethyl ethyl cellulose, carboxymethyl ethyl hydroxyethyl cellulose.

The carboxycellulose may also contain cationic groups as long as the overall charge is net anionic, i.e. the degree of substitution with anionic groups and cationic groups is such that the net charge is anionic. In an embodiment, the anionic polysaccharide is free or substantially free from cationic groups. The cationic groups are suitably bonded to the cellulose back bone with a linking group, which may be substituted, as in linkages containing amine and/or amido functions. Suitable cationic groups include salts of amines, suitably salts of tertiary amines, and quaternary ammonium groups, preferably quaternary ammonium groups. The substituents attached to the nitrogen atom of amines and quaternary ammonium groups can be same or different and can be selected from alkyl, cycloalkyl, and alkoxyalkyl, groups, and one, two or more of the substituents together with the nitrogen atom can form a heterocyclic ring. The substituents independently of each other usually comprise from 1 to about 24 carbon atoms, preferably from 1 to about 8 carbon atoms. The nitrogen of the cationic group can be attached to the polysaccharide by means of a chain of atoms which suitably comprises carbon and hydrogen atoms, and optionally O and/or N atoms. Usually the chain of atoms is an alkylene group with from 2 to 18 and suitably 2 to 8 carbon atoms, optionally interrupted or substituted by one or more heteroatoms, e.g. O or N such as alkyleneoxy group or hydroxy propylene group. Preferred anionic polysaccharides containing cationic groups include those obtained by reacting the anionic polysaccharide with a quaternization agent selected from 2, 3-epoxypropyl trimethyl ammonium chloride, 3-chloro-2-hydroxypropyl trimethyl ammonium chloride and mixtures thereof.

The carboxycellulose may also contain further anionic groups, such as sulphate, sulphonate, phosphate and phosphonate groups, suitably these groups are directly bonded to the cellulose backbone, or they are also linked to the cellulose back bone with a linking group.

Suitable linking groups of the invention are alkyl groups, such as methyl, ethyl, propyl and mixtures thereof, typically methyl, as in CMC.

As will be apparent to those of average skill in the art suitable carboxycellulose products are commercially available, such as the Akucell®, Depramin®, Peridur®, Staflo®, Gabroil® and Gabrosa® product ranges from AkzoNobel.

The molecular weight of the carboxycellulose, expressed as the weight averaged molecular weight (Mw), is not very critical. Suitably products ranging from very low viscosity grades with a typical Mw of 2.000 Dalton up to ultra-high viscosity grades, such as those with a Mw of 10,000.000 Dalton, are used. In an embodiment the Mw is less than 2,500,000, 1,000,000, 500,000, 350,000, 250,000 or 200,000 Dalton for ease of dissolution. In an embodiment the Mw is more than 5,000, 20,000, 75,000, 125,000, 150,000, or more than 175,000 for higher viscosity of the end-product after dissolution. In embodiments of the invention, the carboxycellulose is added in the solid form, suitably as pure carboxycellulose, or dissolved in a suitable quantity of aqueous liquid, such as (tap) water. The latter can make the process of blending the cellulose material and the carboxycellulose more efficient. In embodiments of the invention, step b) comprises adding to the aqueous slurry provided in step a) an aqueous solution comprising dissolved therein the carboxycellulose, typically at a level of 1-10 wt. %, 2-7.5 wt. %, or 3-6 wt. %.

In embodiments of the invention, the blended composition produced in step b) comprises, on a dry solids weight basis, at least 1.0 wt. %, at least 1.5 wt. %, at least 2.0 wt. %, at least 2.5 wt. %, at least 3.0 wt. %, at least 4.0 wt. %, or at least 5 wt. % of carboxycellulose. In embodiments according to the invention, the blended composition produced in step b), comprises, on a dry solids weight basis, less than 20 wt. %, less than 15 wt. %, less than 10 wt. %, less than 8 wt. %, less than 7 wt. %, or less than 6 wt. % of the carboxycellulose.

In embodiments of the invention, the blended composition produced in step b) comprises, on a dry solids weight basis, less than 99 wt. %, less than 98.5 wt. %, less than 98 wt. %, less than 97.5 wt. %, less than 97 wt. %, less than 96 wt. %, or less than 95 wt. % of the cellulose material. In embodiments according to the invention, the blended composition produced in step b), comprises, on a dry solids weight basis, more than 80 wt. %, more than 85 wt. %, more than 90 wt. %, more than 92 wt. %, more than 93 wt. %, or more than 94 wt. % of the cellulose material.

In embodiments of the invention, the blended composition produced in step b) comprises the cellulose material and the carboxycellulose in a ratio (w/w) of more than 90/10, preferably within the range of 93/7 to 99.5/0.5, 94/6 to 99/1 or 95/5 to 98/2.

In embodiments of the invention, a homogeneous slurry of the carboxycellulose and the cellulose material is produced using e.g. conventional mixing or blending equipment, typically mixing or blending equipment exerting low mechanical shear.

As will be understood by those skilled in the art, the addition of the carboxycellulose as an aqueous solution inherently reduces the (relative) amount of the cellulose material to some extent. Hence, this step can be used to further adjust the content of the cellulose material to the level appropriate for the activation/fibrillation treatment. The appropriate level may depend on the technique used to perform the activation treatment.

In accordance with a preferred embodiment of the invention, wherein the activation/fibrillation is performed using high shear homogenization, a slurry is produced/obtained in step b) having a content of the cellulose material, based on the total weight of the slurry, of less than 20 wt. %, less than 15 wt. % or less 10 wt. %. In embodiments of the invention, the content of the cellulose material, based on the total weight of the slurry, is at least 0.5 wt. %, at least 1.0 wt. %, at least 1.5 wt. %, at least 1.75 wt. %, or at least 2.0 wt. %. In embodiments of the invention, the content of the cellulose material, based on the total weight of the slurry, is less than 9.0 wt. %, less than 8.0 wt. %, less than 7.0 wt. %, less than 6.0 wt. %, less than 5.0 wt. %, less than 4.5 wt. %, less than 4 wt. %, less than 3.5 wt. %, less than 3 wt. %, or less than 2.5 wt. %.

Embodiments are also envisaged wherein the mechanical and/or physical activation/fibrillation treatment is performed using refining equipment specifically designed to process slurries containing more than 10 wt. % or more than 20 wt. % of cellulose material, such as described in WO 2017/103329. This may improve the efficiency of the processing in various way. For instance, the concentrating step after the activation/fibrillation treatment may become superfluous. Hence, In accordance with a preferred embodiment of the invention, wherein the activation/fibrillation is performed using e.g. refining equipment, such as the equipment described in WO 2017/103329, a slurry is produced/obtained in step b) having a content of the cellulose material, based on the total weight of the slurry, of at least 10 wt. %, at least 15 wt. % or at least 20 wt. %, e.g. a content within the range of 10-30 wt. %, 15-25 wt. %

Activation of the Cellulose—Step c)

Subsequently, the homogeneous slurry is subjected to (generally known) treatments, typically involving subjecting the cellulose material to high mechanical or physical (shear) forces, that alter the morphology of the cellulose, typically through the partial, substantial or complete liberation of cellulose microfibrils from the cellulose fiber structure and/or the opening up of the cellulose fiber network structure, thereby significantly increasing the specific surface area thereof. This treatment may be referred to as the 'activation' treatment, whereby the cellulose material actually gains its beneficial rheological profile. Such treatments are referred to herein as "mechanical/physical fibrilation treatment" or "mechanical/physical activation treatment" (or the like). As is known by those skilled in the art, similar changes in the morphology and/or functional properties of the cellulose material can be brought about using certain enzymatic procedures, known as HefCel treatment. This treatment is referred to herein as "enzymatic fibrillation treatment" or "enzymatic activation treatment".

In some embodiments of the invention the mechanical and/or physical treatment is applied to produce a microfibrillated cellulose (MFC) material. The term "microfibrillated cellulose (MFC)" in the context of the present invention is defined as cellulose consisting (substantially) of microfibrils in the form of either isolated cellulose microfibrils and/or microfibril bundles of cellulose, both of which are derived from a cellulose raw material. MFC microfibrils typically have a high aspect ratio. Microfibrillated cellulose fibers typically have a diameter of 10-300 nm, preferably 25-250 nm, more preferably 50-200 nm, and a length of several micrometers, preferably less than 500 µm, more preferably 2-200 µm, even more preferably 10-100 µm, most preferably 10-60 µm. Microfibrillated cellulose comprises often bundles of 10-50 microfibrils. Microfibrillated cellulose may have high degree of crystallinity and high degree of polymerization, for example the degree of polymerisation DP, i.e. the number of monomeric units in a polymer, may be 100-3000. As used herein, "microfibrillated cellulose" can be used interchangeably with "microfibrillar cellulose," "nanofibrillated cellulose," "nanofibril cellulose," "nanofibers of cellulose," "nanoscale fibrillated cellulose," "microfibrils of cellulose," and/or simply as "MFC." Additionally, as used herein, the terms listed above that are interchangeable with "microfibrillated cellulose" may refer to cellulose that has been completely microfibrillated or cellulose that has been substantially microfibrillated but still contains an amount of non-microfibrillated cellulose at levels that do not interfere with the benefits of the microfibrillated cellulose as described and/or claimed herein.

In some embodiments of the invention, the mechanical and/or physical treatment is applied to reduce the particle size of the cellulose material so as to yield a particulate material or cellulose fine material having a characteristic size distribution. When the distribution is measured with a laser light scattering particle size analyzer, such as the Malvern Mastersizer or another instrument of equal or better sensitivity, the diameter data is preferably reported as a volume distribution. Thus the reported median for a population of particles will be volume-weighted, with about one-half of the particles, on a volume basis, having diameters less than the median diameter for the population. Typically, the slurry is treated so as to obtain a particulate composition having a reported median major dimension (D[4,3]), within the range of 15-75 µm, as measured using laser diffraction particle size analysis. A suitable apparatus for this (and other) particle size characteristics is a Malvern Mastersizer 3000 obtainable from Malvern Instruments Ltd., Malvern UK, using a Hydro MV sample unit (for wet samples). In preferred embodiments of the invention, the slurry is treated so as to obtain a composition having a reported median major dimension within the range of 20-65 µm or 25-50 µm. Typically, the reported D90 is less than 120 µm, more preferably less than 110 µm, more preferably less than 100 µm. Typically the reported D10 is higher than 5 µm, more higher than 10 µm, more preferably higher than 25 µm. In an embodiment, In accordance with certain embodiments, the mechanical and/or physical treatment does not result in the complete or substantial unraveling to nanofibrils.

Furthermore, the invention provides embodiments wherein a mechanical and/or physical treatment is applied whereby the specific surface of the cellulose material, as determined using a Congo red dye adsorption method (Goodrich and Winter 2007; Ougiya et al. 1998; Spence et al. 2010b), is increased. In some embodiments of the invention, said specific surface area is at least 30 m$^2$/g, at least 35 m$^2$/g, at least 40 m$^2$/g, at least 45 m$^2$/g, at least 50 m$^2$/g, or at least 60 m$^2$/g. In some embodiments of the invention, said specific surface area is at least 4 times higher than that of the untreated (i.e. non-shear-treated) cellulose, e.g. at least 5 times, at least 6 times, at least 7 times or at least 8 times.

To accomplish the desired structure modification a high mechanical shear treatment is preferrably applied. Examples of suitable techniques include high pressure homogenization, microfluidization and the like. Most preferred examples of high shear equipment for use in step b) include friction grinders, such as the Masuko supermasscolloider; high pressure homogenizers, such as a Gaulin homogenizer, high shear mixers, such as the Silverson type FX; in line homogenizers, such as the Silverson or Supraton in line homogenizer; and microfluidizers. The use of this equipment in order to obtain the particle properties in accordance with some embodiments of this invention is a matter of routine for those skilled in the art. The methods described here above may be used alone or in combination to accomplish the desired structure modification.

In preferred embodiments of the invention, the mechanical and/or physical treatment is performed using a high pressure homogenization wherein the material is passed over the homogenizer operated at a pressure of 50-1000 bar, preferably at 70-750 bar or 100-500 bar. In embodiments of the invention, the slurry is passed through said apparatus a number of times. In such embodiments, the mechanical and/or physical treatment comprises 2, 3, 4, 5, 6, 7, 8, 9 or 10 passes of the slurry through said apparatus while operating at suitable pressures as defined here above. It will be apparent to those of average skill in the art that the two variables of operating pressure and number of passes are interrelated. For instance, suitable results will be achieved by subjecting the slurry to a single pass over the homogenizer operated at 500 bar as well as by subjecting the slurry to 6 passes over the homogenizer operated at 150 bar. It is within the routine capabilities of the person skilled in the art to make appropriate choices, the suitability of which can be verified by subjecting the homogenized slurry to particle size analysis in accordance with what is defined here above.

As indicated herein before, the high mechanical shear treatment of step c) may be performed using other types of equipment and it will be within the skilled person's (routine) capabilities to determine operating conditions resulting in equivalent levels of mechanical shear.

Mechanical Dewatering—Step d)

In accordance with embodiments of the invention, the activation/fibrillation treatment of step c) is followed by a step d) wherein at least part of the water is removed. Preferably step d) is a mechanical or non-thermal dewatering treatment. In one preferred embodiment of the invention step d) comprises filtration, e.g. in a chamber filter press. The removal of water may aid in the removal of a substantial fraction of dissolved organic material as well as a fraction of unwanted dispersed organic matter, i.e. the fraction having a particle size well below the particle size range of the particulate cellulose material. Preferably, step d) of the process does not involve or comprise a thermal drying or evaporation step, since such steps are uneconomical and/or can lead to hornification of the cellulose.

As will be understood by those skilled in the art, it is possible to incorporate multiple processing steps in order to achieve optimal results. For example, an embodiment is envisaged wherein the mechanical treatment of step b) is followed by subjecting the mixture to microfiltration, dialysis or centrifuge decantation, or the like, followed by a step of pressing the composition. As will be understood by those skilled in the art, the removal of water in step d) may also comprise the subsequent addition of water or liquid followed by an additional step of removal of liquid, e.g. using the above described methods, to result in an additional washing cycle. This step may be repeated as many times as desired in order to achieve a higher degree of purity.

In accordance with the invention, in step d), the slurry obtained in step c) is concentrated to a dry matter content of at least 5 wt. %, at least 10 wt. %, preferably at least 15 wt. %, at least 20 wt. %, at least 25 wt. % or at least 30 wt. %.

Based on the present teachings, it will be understood by those skilled in the art, that the concentration step may not be needed to reach the aforementioned target dry matter levels in case the activation/fibrillation treatment is performed on a mixture with high cellulose material content. In such cases the concentration step may be omitted. It is also envisaged that even in such embodiments a concentration step can be performed nonetheless to reach relatively high dry matter levels, such as at least 20 wt. %, at least 25 wt. % or at least 30 wt. %.

Optionally Blending Additional Quantity of Carboxycellulose—Step e)

In certain embodiments according to the invention, step d) is followed by a step e) comprising the addition of a further quantity of carboxycellulose to the composition obtained from step d). In preferred embodiments, an additional quantity of carboxycellulose is blended with the composition obtained in step d) to produce a composition comprising on a dry weight basis 20-80 wt. % of the cellulose material and 20-80 wt. % of the carboxycellulose, more preferably 40-70 wt. % of the cellulose material and 30-60 wt. % of the carboxycellulose, more preferably 50-70 wt. % of the cellulose material and 30-50 wt. % of the carboxycellulose. In preferred embodiments, an additional quantity of carboxycellulose is blended with the composition obtained in step d) to produce a composition comprising the cellulose material and the carboxycellulose at a weight ratio within the range of 20/80 to 80/20, preferably with the range of 40/60 to 70/30, more preferably within the range of 50/50 to 70/30. In preferred embodiments, an additional quantity of carboxycellulose is blended with the composition obtained in step d) to produce a composition comprising more than 30 wt. %, on a dry weight basis, of the carboxycellulose, e.g. more than 31 wt. %, more than 32 wt. % more than 33 wt. % more than 34 wt. % or more than 35 wt. %. In embodiments of the invention, the cellulose material and the carboxycellulose constitute at least 80 wt. % of the dry solids weight of the composition, e.g. at least 85 wt. %, at least 90 wt. %, at least 95 wt. %, at least 96 wt. %, at least 97 wt. %, at least 98 wt. %, at least 99 wt. % or at least 99.5 wt. %.

The additional quantity of the carboxycellulose is homogeneously blended with the composition obtained in step d). This can be done with any suitable industrial mixing or kneading system. Such systems can be continuous or batchwise. Suitable continuous mixers can be single or double shafted and co- or counter current. An example of a suitable system is the continuous single shafted Extrudomix from Hosokawa, which is designed to mix solids and liquids. Suitable batch mixers can be horizontal or vertical mixing systems. Suitable industrial horizontal mixers have e.g. Z-shaped paddles or ploughshaped mixing elements. Preferred systems include intermeshing mixing elements that produce forced flow of the paste between the elements (e.g. horizontal Haake kneader). Industrial vertical mixers are commonly planetary mixers. A preferred system includes double planetary mixers or single planetary mixers with a counter current moving scraper, such as vertical mixer Tonnaer, or a system equipped with a mixing bowl turning around in opposite direction to the mixing element.

Thermal Dewatering—Step f)

In certain embodiments of the invention a method as defined herein is provided wherein step d) or e) is followed by a thermal drying treatment, in order to produce a more concentrated product. In an embodiment of the invention a method as defined herein is provided wherein step f) comprises drying the composition obtained in step d) or e) to a dry-matter content of at least 10 wt. %, based on the total weight of the material, preferably at least 20 wt. %, at least 25 wt. %, at least 30 wt. %, at least 35 wt. %, at least 40 wt. %, at least 45 wt. %. In embodiments of the invention, step f) is performed to attain a dry-matter content of less than 49 wt. %.

Without wishing to be bound by any theory, the temperature at which the concentrate is dried is believed to affect the chemical, structural and/or functional properties of the material obtained. In accordance with the invention the temperature of the material during the drying step is typically kept below 120° C. In an embodiment of the invention a method as defined herein is provided wherein step d) comprises a thermal drying treatment wherein the concentrate produced in step d) or e) is heated to a temperature within the range of 30-110° C., more preferably within the range of 40-100° C., more preferably within the range of 50-95° C., more preferably within the range of 60-90° C., most preferably within the range of 70-85° C.

In certain embodiments of the invention a method as defined herein is provided wherein step f) comprises a thermal drying treatment wherein the concentrate is subjected to temperatures as defined here above. In certain embodiments of the invention a method as defined herein is provided wherein step f) comprises a thermal drying treatment wherein the concentrate is placed in a dryer which is operated at temperatures as defined here above. Typically, in accordance with the invention, the drying step is performed using industrial drying equipment known to the skilled person such as a rotary dryer, static oven, fluidized bed, conduction dryer, convection dryer, conveyer oven, belt dryer, vacuum dryer, etc. Preferably a dryer is used that achieves heat transfer and/or moisture removal by a gentle thermal treatment, such as by convection utilizing warm or hot air. Hence, in one embodiment of the invention step f) comprises subjecting said concentrate to a drying step wherein the concentrate is placed in an environment with an air temperature of below 120° C., preferably a temperature within the range of 30-110° C., more preferably within the range of 40-100° C., more preferably within the range of 50-95° C., more preferably within the range of 60-90° C., most preferably within the range of 70-85° C. In one embodiment of the invention step f) comprises subjecting said concentrate to a drying step wherein the concentrate is contacted with air heated to the aforementioned temperatures.

In embodiments of the invention step f) comprises subjecting said concentrate to a drying step using a convection oven. In other embodiments of the invention step f) comprises subjecting said concentrate to a drying step using a belt dryer. In other embodiments of the invention step f) comprises subjecting said concentrate to a drying step using a flash dryer As will be understood by those skilled in the art based on the present teachings, the time needed to achieve the target water level in step f) will depend, amongst others, on the water content of the concentrate before drying, on the exact nature of the material, on the temperature applied, etc. It is within the capabilities of those of average skill in the art to carry out the process taking account of these variables. In an embodiment of the invention, a method as defined herein is provided wherein step f) comprises a thermal drying treatment wherein the concentrate is subjected for heating under conditions and for a period of time sufficient to reach a water content as specified here above.

Preferred Embodiments

A preferred embodiment of the invention, concerns a process as defined herein comprising the steps of:

a) providing a slurry comprising an aqueous liquid and a plant or micro-organism derived cellulose material, preferably a (bio-)chemically treated plant or micro-organism derived cellulose material;

b) blending a quantity of carboxycellulose with the slurry, whereby a slurry is obtained having a content of the cellulose material of less than 10 wt. %, based on the weight of the mixture or slurry, preferably less than 5 wt. %;

c) subjecting the mixture or slurry obtained in step b) to mechanical/physical and/or enzymatic activation/fibrillation treatment;

d) concentrating the slurry as obtained in step c) to a dry matter content of at least 5 wt. %, preferably at least 10 wt. %; and e) optionally, blending a further quantity of the carboxycellulose with the composition as obtained in step d)

In a particularly preferred embodiment, a process as defined herein is provided comprising the steps of:

a) providing a slurry comprising an aqueous liquid and a (bio-)chemically treated plant or micro-organism derived cellulose material;

b) blending a quantity of carboxycellulose with the slurry, so as to obtain a slurry comprising the cellulose material at a level of 1-5 wt. %, based on the total weight of the slurry and wherein the ratio (w/w) of the cellulose material and the carboxycellulose is within the range of 90/10-99/1, preferably within the ratio of 95/5-99/1;

c) subjecting the slurry obtained in step b) to mechanical/physical and/or enzymatic activation/fibrillation treatment, preferably to high-pressure homogenization; and d) mechanically dewatering the composition obtained in step c) using a filter press to produce a paste with a dry matter content of at least 5 wt. %, preferably at least 10 wt. %, more preferably at least 15 wt. %;

e) optionally, blending a further quantity of the carboxycellulose with the paste as obtained in step d); and f) optionally, drying the paste as obtained in step d) or e) to a dry-matter content of at least 25 wt. %.

Product Obtainable by the Method

Another aspect of the present invention concerns products obtainable by the present invention.

As will be evident from the foregoing, a particular advantage of the composition obtainable by the method according to the present invention is that they can be dispersed in water or aqueous systems without having to apply high-intensity mechanical treatment to form a homogenous structured system.

Typically, in accordance with the invention, these beneficial properties can be established using simple testing methods. In particular, the compositions of the invention can be dispersed at a concentration of the cellulose component of 1 wt. % (w/v) in water by mixing a corresponding amount of the powder in 200 ml of water in a 400 ml beaker having a 70 mm diameter (ex Duran) and a propeller stirrer equipped with three paddle blades each having a radius of 45 mm, for instance a R 1381 3-bladed propeller stirrer ex IKA (Stirrer Ø: 45 mm Shaft Ø: 8 mm Shaft length: 350 mm), placed 10 mm above the bottom surface and operated at 700 rpm for 120 minutes, at 25° C. With such a set-up, the powder composition will be completely dispersed within the 120 minutes, at 25° C., where completely dispersed means that no solids or lumps can be visually distinguished anymore. Furthermore, a dispersion of the present composition in water, at a concentration of the cellulose component of 1% (w/v) prepared using this particular protocol has one or more of the rheological characteristics described in the subsequent paragraphs.

In embodiments of the invention, a dispersion of the present composition in water, at a concentration of the cellulose component of 1% (w/v), obtained using the above described protocol shows no syneresis after standing for 16 hours at 25° C. in a 200 ml graduated cylinder of about 300 mm height. Within the context of the present invention, no syneresis means that if a layer of water is formed on top of the dispersion it is less than 1 mm or that no such layer of water is distinguishable at all.

The structured system obtained when dispersing the composition at a concentration of the cellulose component of 1% (w/v) in water, according to the above described protocol, typically will take the form of a viscoelastic system or a gel. Typically, the viscoelastic behavior of these systems can be further determined and quantified using dynamic mechanical analysis where an oscillatory force (stress) is applied to a material and the resulting displacement (strain) is measured. The term "Storage modulus", G', also known as "elastic modulus", which is a function of the applied oscillating frequency, is defined as the stress in phase with the strain in a sinusoidal deformation divided by the strain; while the term "Viscous modulus", G'', also known as "loss modulus", which is also a function of the applied oscillating frequency, is defined as the stress 90 degrees out of phase with the strain divided by the strain. Both these moduli, are well known within the art, for example, as discussed by G. Marin in "Oscillatory Rheometry", Chapter 10 of the book on Rheological Measurement, edited by A. A. Collyer and D. W. Clegg, Elsevier, 1988. In the art, gels are defined to be those systems for which G'>G''.

In embodiments of the invention, a dispersion of the present composition in water, at a concentration of the cellulose component of 1% (w/v), obtained using the above described protocol, has a storage modulus G' of at least 100 Pa, more preferably at least 110 Pa, at least 120 Pa, at least 130 Pa, at least 140 Pa or at least 150 Pa. In embodiments of the invention the storage modulus G' of said dispersion is 500 Pa or less, e.g. 400 Pa or less, or 300 Pa or less.

In embodiments of the invention, a dispersion of the present composition in water, at a concentration of the cellulose component of 1% (w/v), obtained using the above described protocol has a storage modulus G' that is higher than the loss modulus G''. More preferably a dispersion of the present powder composition in water, at a concentration of the cellulose component of 1% (w/v), obtained using the above described protocol, has a loss modulus G'' of at least 10 Pa, more preferably at least, 12.5 Pa, at least 15 Pa, at least 17.5 Pa or at least 20 Pa. In embodiments of the invention the loss modulus G'' of said dispersion is 100 Pa or less, e.g. 75 Pa or less, or 50 Pa or less.

In embodiments of the invention, a dispersion of the present composition in water, at a concentration of the cellulose component of 1% (w/v), obtained using the above described protocol has a flow point (at which G'=G'') of at least 10 Pa, more preferably at least, 12.5 Pa, at least 15 Pa, at least 17.5 Pa or at least 20 Pa. In embodiments of the invention the flow point of said dispersion is 75 Pa or less, e.g. 50 Pa or less, or 30 Pa or less. The flow point is the critical shear stress value above which a sample rheologically behaves like a liquid; below the flow point it shows elastic or viscoelastic behavior.

In an embodiment of the invention, a dispersion of the present composition in water, at a concentration of the cellulose component of 1% (w/v), obtained using the above described protocol has a yield point of at least 1 Pa, preferably at least 1.5 Pa, at least 2.0 Pa, at least 2.5 Pa or at least 3 Pa. In embodiments of the invention the yield point of said dispersion is 10 Pa or less, e.g. 7 Pa or less, 6 Pa or less or 5 Pa or less. The yield point is the lowest shear stress, above which a sample shows an irreversible structural change; below the yield point it shows reversible elastic or viscoelastic behavior. Between the yield point and the flow point is the yield zone.

In an embodiment of the invention, a dispersion of the present composition in water, at a concentration of the cellulose component of 1% (w/v), obtained using the above described protocol has a viscosity at 0.01 s$^{-1}$ of at least 150 Pa·s, preferably at least 200 Pa·s, at least 250 Pa·s or at least 300 Pa·s. In embodiments of the invention said dispersion has a viscosity at 0.01 s$^{-1}$ of 750 Pa·s or less, e.g. 600 Pa·s or less or 500 Pa·s or less.

In embodiments of the invention, a dispersion of the present composition in water, at a concentration of the cellulose component of 1% (w/v), obtained using the above described protocol is shear thinning. Shear thinning, as used herein, means that the fluid's resistance to flow decreases with an increase in applied shear stress. Shear thinning is also referred to in the art as pseudoplastic behavior. Shear thinning can be quantified by the so called "shear thinning factor" (SF) which is obtained as the ratio of viscosity at 1 s$^{-1}$ and at 10 s$^{-1}$: A shear thinning factor below zero (SF<0) indicates shear thickening, a shear thinning factor of zero (SF=0) indicates Newtonian behavior and a shear thinning factor above zero (SF>0) stands for shear thinning behavior. In an embodiment of the invention the shear thinning property is characterized by the structured system having a specific pouring viscosity, a specific low-stress viscosity, and a specific ratio of these two viscosity values.

In embodiments of the invention, a dispersion of the present composition in water, at a concentration of the cellulose component of 1% (w/v), obtained using the above described protocol has a pouring viscosity ranging from 25 to 2500 mPa·s, preferably from 50 to 1500 mPa·s, more preferably from 100 to 1000 mPa·s. The pouring viscosity, as defined herein, is measured at a shear rate of 20 s$^{-1}$.

Unless indicated otherwise, viscosity and flow behavior measurements, in accordance with this invention, are performed at 20° C., using an Anton Paar rheometer, Physica MCR 301, with a 50 mm plate-plate geometry (PP50) and a gap of 1 mm. For amplitude sweep testing the angular frequency is fixed at 10 s$^{-1}$ and the strain amplitude (y) is from 0.01% to 500%.

Applications of the Product of the Invention

The present invention concerns the use of the compositions as defined in the foregoing and/or as obtainable by any of the methods described in the forgoing as a dispersable or redispersable composition. In particular the present invention provides the use of the composition as defined in the foregoing and/or as obtainable by any of the methods described in the forgoing to provide a structured fluid water based composition such as a (structured) suspension or dispersion or a hydrogel. The term "fluid water based composition" as used herein refers to water based compositions having fluid or flowable characteristics, such as a liquid or a paste. Fluid water based compositions encompass aqueous suspensions and dispersions. Gels, in accordance with the invention, are structured aqueous systems for which $G'>G''$, as explained herein before.

The fluid water based composition and hydrogels of the invention have water as the main solvent. Fluid water based composition may further comprise other solvents.

The fluid water based composition or hydrogel comprising the powder composition according to the present invention is suitable in many applications or industry, in particular as an additive, e.g. as a dispersing agent, structuring agent, stabilizing agent or rheology modifying agent.

Fluid water based compositions may comprise the powder composition in sufficient quantities to provide a concentration of the cellulose component ranging between 0.25% (w/v) and 3% (w/v), more preferably ranging between 0.5% (w/v) and 2% (w/v) or between 0.75% (w/v) and 1.5% (w/v).

The compositions as defined in the foregoing and/or as obtainable by any of the methods described in the forgoing are in particular suitable to be used in detergent formulations, for example dishwasher and laundry formulations; in personal care and cosmetic products, such as hair conditioners and hair styling products; in fabric care formulations, such as fabric softeners; in paint and coating formulations, such as for example water-born acrylic paint formulations; food and feed compositions, such as beverages, frozen products and cultured dairy; pesticide formulations; biomedical products, such as wound dressings; construction products, as for example in asphalt, concrete, mortar and spray plaster; adhesives; inks; de-icing fluids; fluids for the oil & gas industry, such drilling-, fracking- and completion fluids; paper & cardboard or non-woven products; pharmaceutical products.

Embodiments are also envisaged, wherein the powder composition of the present invention is used to improve mechanical strength, mechanical resistance and/or scratch resistance in ceramics, ceramic bodies, composites, and the like.

In another aspect, the invention provides uses of the compositions as defined herein in accordance with what has been discussed elsewhere. Hence, as will be understood by those skilled in the art, based on the present disclosure, specific embodiments of the invention relate to the use of a composition as defined herein, including a composition obtainable by the methods as defined herein, for modifying one or more rheological properties of a water-based formulation and/or as a structuring agent in a water-based formulation. In an embodiment of the invention uses are provided for modifying one or more rheological properties of a water-based formulation and/or as a structuring agent in a water-based formulation. In an embodiment of the invention uses are provided for conferring the rheological properties according to what is defined here above (to characterize the product of the invention per se).

In another aspect of the invention, methods are provided for producing an aqueous structured formulation, such as the formulations described here above, said process comprising adding the compositions as defined in the foregoing and/or as obtainable by any of the methods described in the forgoing. Such methods will further typically comprise steps to homogeneously blend the powder composition and an aqueous formulation. In some embodiments of the invention, such methods comprise the step of mixing with an industrial standard impeller like a marine propeller, hydrofoil or pitch blade which can be placed with top, side or bottom entry. The method preferably does not involve the use of high speed impellers like tooth saw blades, dissolvers, deflocculating paddles and/or the use of equipment exerting high shear treatment, using for instance rotor-rotor or rotor-stator mixers. In embodiments of the invention, the method does not involve the use of equipment exerting shear in excess of 1000 $s^{-1}$, in excess of 500 $s^{-1}$, or in excess of 250 $s^{-1}$ or in excess of 100 $s^{-1}$.

In another aspect of the invention, methods are provided for improving one or more properties of an aqueous formulation, such as the formulations described here above, said process comprising incorporating into the formulation, the compositions as defined in the foregoing and/or as obtainable by any of the methods described in the forgoing.

Thus, the invention has been described by reference to certain embodiments discussed above. It will be recognized that these embodiments are susceptible to various modifications and alternative forms well known to those of skill in the art. Many modifications in addition to those described above may be made to the structures and techniques described herein without departing from the spirit and scope of the invention. Furthermore, for a proper understanding of this document and its claims, it is to be understood that the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually means "at least one". The term "consisting" wherever used herein also embraces "consisting substantially", but may optionally be limited to its strict meaning of "consisting entirely". Where upper and lower limits are quoted for a property, for example the Mw, then a range of values defined by a combination of any of the upper limits with any of the lower limits may also be implied. It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from any other aspects and embodiments of the invention.

The following examples are offered for illustrative purposes only, and are not intended to limit the scope of the present invention in any way.

EXAMPLES

Example 1: Processing of Sugar Beet Pulp 132 kg of ensilaged sugar beet pulp is washed in a flotation washing machine to remove all non sugar beet pulp items (sand, stones, wood, plastic, etc.). After washing, the sugar beet pulp is diluted with the same volume of water (132 kg) and heated up to 40° C. under continues slow mixing. At this temperature NaOH pellets are added to reach a molarity of 0.5 M (5.3 kg NaOH pellets). Then the temperature is increased to 95° C. The silverson FX is switched on and the mixture is sheared during the complete reaction time of 60 minutes to reach a smooth texture. Then the mixture is cooled down to 80° C. and pumped into a chamber filter press to remove most of the water including a part of the proteins, hemicellulose and pectins. The filtrate is pumped to the sewage and the pressed cake is diluted with water of ambient temperature to a dry matter concentration around 1-2%. Then to this suspension sulfuric acid is added to reach a pH below 2 (about 8 liters of 25% sulfuric acid). After acidifying, the material is mixed with the Silverson FX during 15 minutes. The mixture is subsequently pumped into a chamber filter press to remove most of the (acidified) water. The filtrate is pumped to the sewage and the pressed cake is again taken up in water of ambient temperature to a dry matter content around 1.5% (DM).

To this slurry carboxymethylcellulose (CMC) (Akucell AF0305 obtained from AkzoNobel) was added in a ratio (w/w) of the cellulose component and CMC of 95:5. After complete mixing (overnight) the suspension is pumped to a to high pressure homogenizer (GEA Niro Soavi Ariete NS3024H, Y: 2012, P: 35 MPa, Q: 1600 L/h, Serial: 947.1) and homogenized 3 times at 150 bar.

The homogenized mass is transferred to a filter press (Tefsa filter press HPL, 630×630 mm, 16 bar, serial PT-99576, filter cloth Tefsa CM-275) and pressed to approx. 8% dry matter at 2.2 bar filter pressure. A sample is drawn from the material thus obtained (referred to as "95/5").

The cake is collected and transferred to a Wuxi vacuum emulsifying mixing machine, type ZJR-5, 1.5 kW, volume 5 L. CMC is added to obtain a blend of the cellulose component and CMC in a ratio (w/w) of 70/30. The blend is kneaded for 10 minutes to prepare easy to disperse paste having a total dry matter content of approximately 12 wt. %. A sample is drawn from the material thus obtained (referred to as "70/30").

Several batches were produced following this protocol and each time a 95/5 sample and a 70/30 sample were taken for rheology testing. The samples were tested for re-dispersibility and rheological performance after re-dispersing. To this end, the paste was re-dispersed to produce a 1% cellulose dispersion, by mixing 200 ml of water and an appropriate amount of the paste in a 400 ml beaker having a 70 mm diameter (ex Duran) using a propeller stirrer equipped with three paddle blades each having a radius of 45 mm, for instance a R 1381 3-bladed propeller stirrer ex IKA (Stirrer Ø: 45 mm Shaft Ø: 8 mm Shaft length: 350 mm), placed 10 mm above the bottom surface and operated at 700 rpm for 120 minutes, at 25° C.

Rheology measurements were performed at 20° C. on an Anton Paar rheometer, Physica MCR 301, with a 50 mm plate-plate geometry, PP50, and a gap of 1 mm. The dispersions had a G' of between 100-200 Pa·s; a Yield Point above 3 and a viscosity of more than 200 Pa·s (at 0.01 s$^{-1}$), as can be seen from the data presented in the following table.

| Sample | Viscosity | | Yield point | | LVER | |
|---|---|---|---|---|---|---|
| | 1000 1/s | 0.01 1/s | tau | gamma | G' | Flow point |
| C030517 95/5 | 0.04 | 281 | 3.11 | 8.47 | 147 | 9.9 |
| C090517 95/5 | 0.03 | 320 | 3.29 | 13.51 | 119 | 8.8 |
| C150517 95/5 | 0.04 | 300 | 3.68 | 13.65 | 124 | 9.3 |
| C290517 95/5 | 0.03 | 360 | 3.43 | 15.92 | 104 | 9 |
| C210617 95/5 | 0.04 | 211 | 2.71 | 9.91 | 114 | 8.3 |
| C030517 70/30 | 0.09 | 246 | 2.12 | 2.28 | 193 | 10.7 |
| C090517 70/30 | 0.09 | 384 | 3.07 | 3.2 | 228 | 8.7 |
| C150517 70/30 | 0.09 | 353 | 5.83 | 6.85 | 220 | 9.3 |
| C290517 70/30 | 0.1 | 462 | 4.4 | 3.96 | 298 | 8.8 |
| C210617 70/30 | 0.09 | 376 | 5.5 | 6.08 | 227 | 5.9 |

The compositions comprising cellulose and carboxycellulose had the desired rheological properties, could be easily activated/fibrillated and concentrated. Similar formulations without carboxycellulose were very difficult to activate/fibrillate.

Example 2: Processing of Sugar Beet Pulp

A batch of 200 kg of ensilaged sugar beet pulp is washed by a flotation washer and a drum washer to remove all non sugar beet pulp items (sand, stones, wood, plastic). After washing 249 kg of sugar beet pulp is diluted with 341 kg of process water to a total weight of 600 kg. This mass is heated up to 80° C. under continuous slow mixing. When 80° C. is reached 1% (w/w) sulfuric acid is added. During 180 minutes this mass is slowly mixed while the Ph is around 1,5. After 180 minutes the mass is pumped into a chamber filter press to remove most of the water including a part of the protein, hemicellulose and pectins. The filtrate is pumped to the sewage and the pressed cake is transported to the alkali extraction tank. 78 kg pressed cake is diluted with process water to a total weight of 600 kg. The DM content after dilution is 2.59% (w/w). This mass is heated up to 40° C. and then 1% (w/w) NaOH is added to reach a Ph of around 11. The mixture is then heated up to 95° C. and during 30 minutes slowly mixed and during 30 minutes high shear mixed by a Silverson FX mixer to reach smooth and lump free texture. This mixture is the cooled down to 80° C. and subsequently pumped into a chamber filter press to remove most of the water including the alkali soluble part of the protein, hemicellulose and pectins. The filtrate is pumped to the sewage and the pressed cake is again taken up into process water of ambient temperature to a dry matter content around 1.5%.

To this slurry carboxymethylcellulose (CMC) (Akucell AF0305 obtained from AkzoNobel) was added in a ratio (w/w) of the cellulose component and CMC of 95:5. After complete mixing (overnight) the suspension is pumped to a to high pressure homogenizer (GEA Niro Soavi Ariete NS3024H, Y: 2012, P: 35 MPa, Q: 1600 L/h, Serial: 947.1) and homogenized 3 times at 150 bar.

The homogenized mass is transferred to a filter press (Tefsa filter press HPL, 630×630 mm, 16 bar, serial PT-99576, filter cloth Tefsa CM-275) and pressed to approx. 8% dry matter at 2.2 bar filter pressure. A sample is drawn from the material thus obtained (referred to as "95/5").

The cake is collected and transferred to a Wuxi vacuum emulsifying mixing machine, type ZJR-5, 1.5 kW, volume 5 L. CMC is added to obtain a blend of the cellulose component and CMC in a ratio (w/w) of 70/30. The blend is kneaded for 10 minutes to prepare easy to disperse paste having a total dry matter content of approximately 12 wt. %. A sample is drawn from the material thus obtained (referred to as "70/30").

Several batches were produced following this protocol and each time a 95/5 sample and a 70/30 sample were taken for rheology testing. The samples were tested for re-dispersibility and rheological performance after re-dispersing. To this end, the paste was re-dispersed to produce a 1% cellulose dispersion, by mixing 200 ml of water and an appropriate amount of the paste in a 400 ml beaker having a 70 mm diameter (ex Duran) using a propeller stirrer equipped with three paddle blades each having a radius of 45 mm, for instance a R 1381 3-bladed propeller stirrer ex IKA (Stirrer Ø: 45 mm Shaft Ø: 8 mm Shaft length: 350 mm), placed 10 mm above the bottom surface and operated at 700 rpm for 120 minutes, at 25° C.

Rheology measurements were performed at 20° C. on an Anton Paar rheometer, Physica MCR 301, with a 50 mm plate-plate geometry, PP50, and a gap of 1 mm. The dispersions had a G' of between 100-200 Pa·s; a Yield Point above 3 and a viscosity of more than 200 Pa·s (at 0.01 s$^{-1}$).

The compositions comprising cellulose and carboxycellulose had the desired rheological properties, could be easily activated/fibrillated and concentrated. Similar formulations without carboxycellulose were very difficult to activate/fibrillate.

The invention claimed is:

1. A process for producing a composition, comprising:
   (a) blending a quantity of carboxycellulose with a mixture of an aqueous liquid and a non-fibrillated plant or micro-organism derived cellulose material to reach a ratio of cellulose material to carboxycellulose (w/w) of more than 90/10;
   (b) subjecting the blend from (a) to mechanical or enzymatic fibrillation treatment, or both;
   (c) mechanically de-watering the composition from (b) to a dry matter content of at least 5 wt. %; and
   (d) blending a further quantity of the carboxycellulose with the composition from (c).

2. The process according to claim 1, wherein the composition from (b) is de-watered to a dry matter content of at least 10 wt. %.

3. The process according to claim 1, wherein the composition from (b) is de-watered to a dry matter content of at least 20 wt. %.

4. The process according to claim 1, wherein the carboxycellulose in (a) is dissolved in water before blending.

5. The process according to claim 1, wherein the carboxycellulose comprises carboxymethylcellulose.

6. The process according to claim 1, wherein the plant or micro-organism derived cellulose material in (a) comprises parenchymal cellulose material derived from a plant pulp.

7. The process according to claim 6, wherein the plant or micro-organism derived cellulose material in (a) is produced by subjecting parenchymal cell containing plant pulp to biological or chemical treatment resulting in partial degradation and/or extraction of pectin and hemicellulose.

8. The process according to claim 7, wherein the biological or chemical treatment comprises an acid treatment, wherein the parenchymal cellulose material is combined with an acidic aqueous solution having a pH within the range of 1-3; and/or an alkaline treatment, wherein the parenchymal cellulose material is combined with an alkaline aqueous solution.

9. The process according to claim 8, wherein the alkaline aqueous solution is sodium hydroxide having a pH within the range of 10-12.

10. The process according to claim 1, wherein the de-watering comprises subjecting the composition of (b) to a high mechanical shear process so as to produce a microfibrillated cellulose.

11. The process according to claim 10, wherein the high mechanical shear process produces a cellulose material having a D[4,3] within the range of 25-75 μm, as measured by laser diffractometry.

12. The process according to claim 1, wherein the blend of (b) comprises cellulose material and the carboxycellulose in a ratio (w/w) within the range of 93/7 to 99.5/0.5.

13. The process according to claim 1, wherein the de-watering of (c) utilizes a filter press.

14. The process according to claim 1, wherein the further quantity of carboxycellulose added in (e) is an amount resulting in a ratio (w/w) of the cellulose component and the carboxycellulose within the range of 20/80 to 80/20.

* * * * *